United States Patent
Kesselmans et al.

(10) Patent No.: US 6,777,548 B1
(45) Date of Patent: Aug. 17, 2004

(54) OXIDATION OF STARCH

(75) Inventors: Ronald Peter W. Kesselmans, Annen (NL); Berend Cornelis A. ter Veer, Zuidlaren (NL); Pieter Hubert Brouwer, Veendam (NL); Thomas Albert Wielema, Groningen (NL)

(73) Assignee: Cooperatieve Verkoop-en Productievereniging van Aardappelmeel en Derivaten AVEBE B.A., Veendam (NL)

( * ) Notice: Subject to any disclaimer, the term of this patent is extended or adjusted under 35 U.S.C. 154(b) by 0 days.

(21) Appl. No.: 09/743,826

(22) PCT Filed: Jul. 28, 1999

(86) PCT No.: PCT/NL99/00484

§ 371 (c)(1),
(2), (4) Date: Feb. 27, 2001

(87) PCT Pub. No.: WO00/06607

PCT Pub. Date: Feb. 10, 2000

(30) Foreign Application Priority Data

Jul. 31, 1998 (EP) .............................................. 98202593

(51) Int. Cl.$^7$ .......................... C08B 31/18; C08B 33/08; C08B 35/08; C07H 1/00
(52) U.S. Cl. ....................... 536/105; 536/102; 536/120; 536/124
(58) Field of Search ................................ 536/105, 102, 536/120, 124

(56) References Cited

U.S. PATENT DOCUMENTS 4,171,407 A * 10/1979 Elser et al. .................. 428/500
4,841,040 A    6/1989 Just et al.

FOREIGN PATENT DOCUMENTS

| DE | 20 07 408   | 10/1970 |
| EP | 0 811 633 A2 | 12/1977 |
| EP | 0 799 837 A2 | 10/1997 |
| GB | 1 425 822   | 2/1976  |
| JP | 01 313501   | 12/1989 |
| WO | WO 97/04167 | 2/1997  |

OTHER PUBLICATIONS

"Manufacture of Starch Solutions at Low Temperatures", Gumory, P., *Abstract Bulletin of the Institute of Paper Chemistry*, vol. 60, No. 11, p. 1107, May, 1990, XP000106834.

"Optimisation of conditions of synthesis of oxidised starch from corn and amaranth for use in film–forming applications", Chattopadhyay S et al., *Carbohydrate* Polymers, vol. 34, No. 4, 1997, pp. 203–212, XP004113375.

* cited by examiner

*Primary Examiner*—James O. Wilson
*Assistant Examiner*—Everett White
(74) *Attorney, Agent, or Firm*—Hoffmann & Baron, LLP

(57) ABSTRACT

The invention relates to a process for the oxidation of starch, wherein a root or tuber starch comprising at least 95 wt. % of amylopectin, based on dry substance of the starch, is treated with an oxidizing agent and the resulting product is subjected to an alkaline treatment, said treatment comprising keeping the product for at least 15 minutes at a temperature of 20–50° C. and a pH higher than 10. The invention further relates to an oxidized starch obtainable by said process and to various applications of said oxidized starch.

7 Claims, No Drawings

OXIDATION OF STARCH

BACKGROUND OF THE INVENTION

The invention relates to oxidized starch, the production thereof, as well as to the use of oxidized starch in various applications.

Oxidized starches have found many applications in industry. Examples of common applications include the use of oxidized starch in the paper industry, for instance in coatings or surface sizing, the adhesive industry, the textile industry, and the food industry.

The preparation of oxidized starches is conventionally carried out by oxidation with an alkali metal hypochlorite, which is a relatively cheap oxidizing agent.

The main factors controlling the oxidation reaction are the amount of alkali metal hypochlorite used, the pH, the temperature, and the use of metal and/or bromide ions as catalyst. An overview of the most important reaction parameters may be found in an article by J. Potze and P. Hiemstra in Starch, vol. 15, pp. 217–225 (1963). It has been proposed that dissociation of the hypochlorite in solution and the presence of radicals in the reaction mixture determine the reaction mechanism. Despite the extensive research done, the exact mechanism of the hypochlorite oxidation of starch is, however, still not entirely clarified.

As has been mentioned above, the course of the oxidation reaction using an alkali metal hypochlorite depends much on the pH during the reaction. This dependency has been widely addressed in the literature. The highest reaction rates are found at neutral pH, while the reaction rate decreases with increasing pH. At acidic pH (<5), chlorine is formed, which, for evident reasons, is to be avoided in an industrial process. Thus, from the view of the reaction rate, it would be desirable to perform the oxidation reaction at or around a neutral pH.

During the oxidation of starch with an alkali metal hypochlorite, different reactions occur. These reactions lead to the introduction of carboxyl and carbonyl groups, and to the degradation of the starch molecule. The course of all these reactions, and the balance among them, determine the properties of the oxidized starch that is obtained. The balance among said reactions, i.e. the relative amount in the oxidized starch of carboxyl and carbonyl groups and the extent of degradation of the starch molecule, are, in their turn, dependent on the pH during the oxidation reaction. Hence, the properties of an oxidized starch will depend on the pH at which the oxidation reaction is carried out.

The degradation of the starch molecule during oxidation leads to a lower viscosity of a solution (or dispersion) of the oxidized starch, which is usually desired of an oxidized starch. It has been found that the degradation occurs to a farther extent at neutral pH of about 7–7.5, than at alkaline pH, such as pH 9 or higher. In other words, in order to obtain an optimal yield of oxidized starch providing a solution or dispersion of low viscosity, the oxidation reaction should preferably be carried out at neutral pH.

However, the viscosity in solution (or dispersion) is not the only important property of an oxidized starch. The viscosity of said solution (or dispersion) is, for most purposes, required to not, or hardly, fluctuate in time. The viscosity of the solution (or dispersion) should remain stable during storage.

Carboxyl groups, that may be introduced in the starch during the oxidation reaction, provide the desired stability of the viscosity of an oxidized starch solution or dispersion. The higher number of carboxyl groups, the better the viscosity stability. Contrary to the degradation of the starch, the amount of carboxyl groups introduced in the starch during oxidation with an alkali metal hypochlorite is small when the oxidation is carried out at neutral pH. The pH at which a high number of carboxyl groups is introduced lies around 8.5.

Besides choosing the oxidation reaction conditions so that a high number of carboxyl groups are introduced, the stability of the viscosity of solutions (or dispersions) of oxidized starch may be increased by introducing ether or ester groups in the starch. Examples of such groups include hydroxyethyl, hydroxypropyl and acetyl groups. Disadvantages of this route are that an additional derivatization step is needed, in which toxic reagents are used.

The number of carbonyl groups introduced in the starch during oxidation negatively affects the stability of the viscosity of the oxidized starch in solution (or dispersion). It further leads to a more brown-yellow color of a solution or dispersion of the oxidized starch, which is usually not wanted. The amount of carbonyl groups introduced is also dependent on the pH during the oxidation reaction. At neutral pH, a relatively high number of carbonyl groups is introduced. At a higher pH, less carbonyl groups will be introduced during oxidation.

From the above, it will be clear that the choice for the pH at which conventional oxidation reactions of starch using an alkali metal hypochlorite are performed, constitutes a compromise between efficient starch degradation and stability of the viscosity of the oxidized starch when dissolved or dispersed. This compromise becomes even more apparent from the data presented in the below table I.

TABLE I

| | pH during oxidation | | |
|---|---|---|---|
| | 7.0–7.5 | 8.0–9.0 | 9.5–10.5 |
| Degradation | +++ | + | ++ |
| Carboxyl groups | + | +++ | ++ |
| Carbonyl groups | +++ | ++ | + |

In table I, the number of +'s indicates the extent to which the specific reaction occurs at a given pH.

Conventionally, the pH during oxidation of starch using an alkali metal hypochlorite is chosen at 8.5 or higher, dependent mostly on the desired viscosity of the oxidized starch.

The international patent application WO-A-97/04167 relates to the use of an amylopectin type starch, obtained from potato that has been modified by genetic engineering to suppress the formation of amylose-type starch, as a finishing agent in papermaking. The amylopectin type starch is subjected to oxidation, enzymatic treatment, acid hydrolysis or thermo-chemical conversion. The disclosed oxidation process is performed at pH 9.5. According to the document, the obtained oxidation product may, as such, be used as a finishing agent in papermaking.

As has been indicated above, for reasons of stability, in particular viscosity stability, of the oxidized starch, the oxidation process is usually carried out at a pH higher than 8.5. However, the high pH adversely affects the reaction rate. Also, carrying out the oxidation process at this pH has the effect that relatively high amounts of oxidizing agent are necessary to achieve the desired viscosity. As the oxidizing agent is usually an alkali metal hypochlorite, the more oxidizing agent is used, the higher the risk that a certain amount of chlorine ends up in the oxidation product. The presence of chlorine is for evident reasons highly undesirable with respect to (public) health and the environment.

SUMMARY OF THE INVENTION

The present invention aims to overcome the above problems. The invention further aims to provide a process for the oxidation of starch wherein significantly less oxidizing agent is necessary than in the prior art processes. It is also an object of the invention to provide a process for the oxidation of starch wherein an oxidized starch is obtained, which has excellent properties, such as viscosity and (viscosity) stability.

DETAILED DESCRIPTION OF THE INVENTION

Surprisingly, it has been found that the above objects are achieved by oxidizing a specific type of starch and by subjecting the oxidation product to an alkaline treatment. Thus, the invention relates to a process for the oxidation of starch, wherein a root or tuber starch comprising at least 95 wt. % of amylopectin, based on dry substance of the starch, is treated with an oxidizing agent and the resulting product is subjected to an alkaline treatment, which treatment comprises keeping the product for at least 15 minutes at a temperature of 20–50° C. and a pH higher than 10.

It has been found that the oxidation of starch according to the invention requires only small amounts of oxidizing agent, while the obtained product has excellent properties, in particular a very good viscosity stability. Furthermore, it has been found that, when an alkali metal hypochlorite is used as an oxidizing agent, much smaller amounts of chlorine are present in the obtained oxidized starch in comparison with prior art oxidized starches. In addition, it has been found that the oxidation process can be carried out in a shorter period of time than the prior art oxidation processes.

As has been indicated above, according to the invention, a starch is oxidized, which starch has a very high amylopectin content. Most starch types consist of granules in which two types of glucose polymers are present. These are amylose (15–35 wt. % on dry substance) and amylopectin (65–85 wt. % on dry substance). Amylose consists of unbranched or slightly branched molecules having an average degree of polymerization of 1000 to 5000, depending on the starch type. Amylopectin consists of very large, highly branched molecules having an average degree of polymerization of 1,000,000 or more. The commercially most important starch types (maize starch, potato starch, wheat starch and tapioca starch) contain 15 to 30 wt. % amylose.

Of some cereal types, such as barley, maize, millet, wheat, milo, rice and sorghum, there are varieties of which the starch granules nearly completely consist of amylopectin. Calculated as weight percent on dry substance, these starch granules contain more than 95%, and usually more than 98% amylopectin. The amylose content of these cereal starch granules is thus less than 5%, and usually less than 2%. The above cereal varieties are also referred to as waxy cereal grains, and the amylopectin starch granules isolated therefrom as waxy cereal starches.

In contrast to the situation of different cereals, root and tuber varieties of which the starch granules nearly exclusively consist of amylopectin are not known in nature. For instance, potato starch granules isolated from potato tubers usually contain about 20% amylose and 80% amylopectin (wt. % on dry substance). During the past 10 years, however, successful efforts have been made to cultivate by genetic modification potato plants which, in the potato tubers, form starch granules consisting for more than 95 wt. % (on dry substance) of amylopectin. It has even been found feasible to produce potato tubers comprising substantially only amylopectin.

In the formation of starch granules, different enzymes are catalytically active. Of these enzymes, the granule-bound starch synthase (GBSS) is involved in the formation of amylose. The presence of the GBSS enzyme depends on the activity of genes encoding for said GBSS enzyme. Elimination or inhibition of the expression of these specific genes results in the production of the GBSS enzyme being prevented or limited. The elimination of these genes can be realized by genetic modification of potato plant material or by recessive mutation. An example thereof is the amylose-free mutant of the potato (amf) of which the starch substantially only contains amylopectin through a recessive mutation in the GBSS gene. This mutation technique is described in, inter. alia, J. H. M. Hovenkamp-Hermelink et al., "Isolation of amylose-free starch mutant of the potato (*Solanum tuberosum L.*)", Theor. Appl. Gent., (1987), 75:217–221, and E. Jacobsen et al., "Introduction of an amylose-free (amf) mutant into breeding of cultivated potato, *Solanum tuberosum L.*, Euphytica, (1991), 53:247–253.

Elimination or inhibition of the expression of the GBSS gene in the potato is also possible by using so-called. antisense inhibition. This genetic modification of the potato is described in R. G. F. Visser et al., "Inhibition of the expression of the gene for granule-bound starch synthase in potato by antisense constructs", Mol. Gen. Genet., (1991), 225:289–296.

By using genetic modification, it has been found possible to cultivate and breed roots and tubers, for instance potato, yam, or cassave (Patent South Africa 97/4383), of which the starch granules contain little or no amylose. As referred to herein, amylopectin potato starch is the potato starch granules isolated from potato tubers and having an amylopectin content of at least 95 wt. % based on dry substance.

Regarding production possibilities and properties, there are significant differences between amylopectin potato starch on the one hand, and the waxy cereal starches on the other hand. This particularly applies to waxy maize starch, which is commercially by far the most important waxy cereal starch. The cultivation of waxy maize, suitable for the production of waxy maize starch is not commercially feasible in countries having a cold or temperate climate, such as The Netherlands, Belgium, England, Germany, Poland, Sweden and Denmark. The climate in these countries, however, is suitable for the cultivation of potatoes. Tapioca starch, obtained from cassave, may be produced in countries having a warm climate, such as is found in regions of South East Asia and South America.

The composition and properties of root and tuber starch, such as amylopectin potato starch and amylopectin tapioca starch, differ from those of the waxy cereal starches. Amylopectin potato starch has a much lower content of lipids and proteins than the waxy cereal starches.

Problems regarding odor and foaming, which, because of the lipids and/or proteins, may occur when using waxy cereal starch products (native and modified), do not occur, or occur to a much lesser degree when using corresponding amylopectin potato starch products. In contrast to the waxy cereal starches, amylopectin potato starch contains chemically bound phosphate groups. As a result, amylopectin potato starch products in a dissolved state have a distinct polyelectrolyte character.

According to the present invention, the amylopectin starch to be oxidized is a root or tuber starch. It has been found that the presence of the lipids and proteins adversely affects the oxidation reaction, leading to by-products because of which the oxidized starch is not of sufficient quality. Furthermore, the presence of lipids and proteins leads to an unacceptably high AOX level, wherein the AOX level is defined as the amount of material that adsorbs to active carbon when the oxidized starch is brought into contact with said active carbon. The AOX level provides an indication of the amount of halogenic material, such as chlorine, in the oxidized starch.

The oxidation of amylopectin potato starch and amylopectin tapioca starch has been found to lead to particularly advantageous oxidized starches.

The oxidation of starch is, according to the invention, carried out with an alkali metal hypochlorite as oxidizing agent. Preferably, sodium hypochlorite is used as as an oxidizing agent. Alkali metal hypochlorites are relatively cheap and have a relatively large oxidizing power, thus leading to a very efficient and fast oxidizing process.

The amount in which the oxidizing agent is added may vary between 0.001 and 0.4 moles of alkali metal hypochlorite per mole starch, preferably between 0.0025 and 0.15 moles of alkali metal hypochlorite per mole starch. The skilled person will be aware that the alkali metal hypochlorite should be added to the starch in a controlled manner. It is one of the advantages of the invention that significantly smaller amounts of oxidizing agent are sufficient, when compared to prior art oxidation processes of starch, for preparing an oxidized starch having the same viscosity.

In a preferred embodiment, the oxidation of starch is performed at pH between 6 and 10, more preferably between 6.5 and 8.5, even more preferably between 7 and 8. It has been found that by working at a pH in these ranges particularly small amounts of oxidizing agent suffice in order to obtain an oxidized starch having excellent properties. As has been mentioned above, it is one of the advantages of the invention that it is possible to perform the oxidation reaction at a lower pH than in conventional processes, while a product having the same viscosity, and an increased viscosity stability, when in solution or dispersion is being prepared.

In order to maintain the pH at a desired value, it may be necessary to add an acid or a base to the reaction mixture. For this purpose, suitable acids and bases may be chosen such that they have substantially no negative effect on the oxidation reaction or on the oxidized starch. Preferably, hydrochloric acid or sodium hydroxide is used.

A problem associated with the prior art processes for oxidizing starch, when carried out at a pH below 8.5, is that during dissolution of the granular oxidized starch in water, at high temperature a very high peak viscosity is observed. In fact, the viscosity may temporarily become so high, that processing is no longer possible. This is an undesired characteristic of oxidized starches, particularly when used at high dry solid concentrations. Surprisingly, it has been found that the problem of the viscosity peak during dissolution does not, or only to an acceptable degree, occur in a process according to the invention, even when the oxidation reaction is carried out at a pH below 8.5.

The temperature at which the starch, in accordance with the invention, is treated with an oxidizing agent is preferably chosen between 20 and 50° C., more preferably between 25 and 40° C.

The oxidation reaction may be carried out as a suspension or solution reaction in water. Preferably, the reaction is carried out as a suspension reaction in water, as this leads to a granular oxidized starch. To this end, the starch to be oxidized is suspended in water in an amount ranging between 0.5 and 1.5 kg of dry starch per liter water.

Optionally, a catalyst or a combination of catalysts may be used in the oxidation reaction. Suitable catalysts include bromide, cobalt, iron, manganese and copper salts. The catalyst or catalysts will be applied in catalytic amounts, which will be no higher than 10 wt. %, with respect to the amount of alkali metal hypochlorite.

An important aspect of the present invention, is that the reaction product of the above described oxidation reaction is subjected to an alkaline treatment. This treatment comprises keeping the product for at least 15 minutes at a temperature of 20–50° C. and a pH higher than 10. Surprisingly, it has been found that the alkaline treatment has a highly beneficial effect on the properties, especially the viscosity stability, of the oxidized starch. An oxidized starch according to the invention may be stored at increased temperatures, e.g. 80° C., for prolonged periods of time without substantially any change in the viscosity of the product being observed.

Preferably, the alkaline treatment lasts at least 30, more preferably at least 60 minutes. Although there is no critical upper limit for the duration of the alkaline treatment, it will usually not be carried out for more than 6 hours in order to prevent that too much of the desired product dissolves in the water. The pH at which the alkaline treatment is carried out is preferably higher than 10.5. Further preferred is that the pH is kept below 12. It has been found that according to these preferred embodiments, an even higher viscosity stability may be achieved.

In view of the above mentioned increased viscosity stability of a solution or disperion of an oxidized starch prepared as disclosed hereinabove, it will be clear that the invention also relates to an oxidized starch obtainable by a method disclosed hereinabove.

It has been found that an oxidized starch prepared in a process according to the invention meets the following conditions:

$(I.V.^* ZGT)^{-1} \geq X$, and $BU_{top}/BU_{90-20} \leq Y$ wherein I.V. is the intrinsic viscosity of the oxidized starch; ZGT is the acid number of the oxidized starch;

$BU_{90-20}$ is the Brabender viscosity of the oxidized starch after being held for 20 minutes at 90° C., measured using the oxidized starch in a concentration resulting in a $BU_{90-20}$ between 100 and 500 BU;

$BU_{top}$ is the peak Brabender viscosity of the oxidized starch, measured at the same concentration as the $BU_{90-20}$;

X is 0.015, preferably 0.017, more preferably 0.019; and

Y is 17, preferably 13, more preferably 10.

According to the invention, the intrinsic viscosity is expressed in dl/g, and may be determined in a known manner, for instance as described in H.W. Leach in Cereal Chemistry, vol. 40, page 595 (1963), using an Ubbelohde viscosity meter and a 1 M sodium hydroxide solution in water as the solvent.

The acid number (ZGT) provides an indication of the number of carboxyl groups present in the oxidized starch. It is defined as the amount in µg equivalent of NaOH which is necessary per gram of dry starch to obtain a pH of 8.6 (µg eq/g ds). The ZGT is determined titrimetrically. The starch is brought in its acid form with hydrochloric acid and titrated to a pH of 8.6 using 0.1 M NaOH.

In order to measure the $BU_{top}$ and $BE_{90-20}$, a Brabender viscograph is used to record a viscosity curve. The Brabender viscosity is expressed in Brabender units (BU). The program used in accordance with the invention to measure the two parameters comprises a heating gradient of 1.5° C./min., a rotation of 75 rpm, and a torque of 250 cmg, using a suspension of the oxidized starch and water comprising 5 to 40 wt. % of dry starch. The suspension is heated from room temperature to 90° C., and kept at that temperature for 20 minutes. The peak viscosity thus obtained is the $BU_{top}$. The viscosity measured after 20 minutes at 90° C. is the $BU_{90-20}$. The concentration of the oxidized starch in the suspension depends on the amount of alkali metal hypochlorite used during oxidation. The concentration should be adjusted such that a $BU_{90-20}$ is obtained in the range of from 100 to 500 BU. Of course, the concentration for measuring $BU_{top}$ is equal to that for measuring $BU_{90-20}$.

The invention further relates to the use of an oxidized starch as described above in the paper, adhesive, textile and food industries.

In the paper industry, oxidized starches have been used as coating binders since 1903. The main purpose of coating paper is to improve its printability. The most important components of a coating (also referred to as coating color) are pigments, such as titanium oxide, calcium carbonate, clays, and the like, binders, such as latices, starches, PVOH, proteins, and the like, and water.

In order to improve the quality of coated paper and to reduce the energy consumption of drying the paper after coating, the trend in the paper industry is to increase the dry solids content of the coating colors. In a presentation at the 18$^{th}$ PTS Coating Symposium 1997 in Munich, P. H. Brouwer and B. C. A. ter Veer showed that low viscous starches, such as oxidized starches, are excellent binders in such high dry solids coatings.

In order to obtain a high dry solids coating, the oxidized starch must be cooked at high concentrations (up to 40%) and stored in that concentration. This means that storage of the starch solution takes place at high temperatures (approximately 80°). As has been mentioned above, the present oxidized starches have an excellent viscosity stability, also at high temperatures. This makes them highly suitable for use as a binder in paper coatings.

Another application of oxidized starches in the paper industry concerns surface sizing, especially in the case of high starches. In surface sizing, a solution of starch is applied on paper. The concentration of the starch solution generally lies between 2 and 20%, preferably between 5 and 12%.

Starches oxidized with relatively low quantities of alkali metal hypochlorite are relatively high viscous starches, having a relatively low amount of carboxyl groups. Starches produced according to the prior art give starch solutions which are not stable in viscosity, even at the low concentrations used in surface sizing. Viscosity stability has therefore to be introduced by chemical means, e.g. by substitution of the starch with acetyl or hydroxy-alkyl substituents. Oxidized starch prepared according to the invention do not need such a modification to give solutions of sufficiently stable viscosity. Thus, the present oxidized starch is highly suitbale for replacing high viscous hydrocolloids, such as polyvinyl aclohol, guar, alginate, carboxymethylcellulose or hydroxyethylcellulose.

Yet another application wherein the present oxidized starch has been found to be highly suitable is in adhesives. The present oxidized starch may be used to adhere two or more layers of paper together to form a multi-layer paper or (card)board. Also, aluminum foil can suitably be adhered onto paper by use of an oxidized starch according to the invention. Further, the present oxidized starch may be used as a component in paper sack adhesives and wall paper adhesives, leading to an adhesive providing improved binding strength. In addition, paper and tape may be gummed with the present oxidized starch to produce stamps or envelopes. In abrasive paper or abrasive linen, the present oxidized starch may be used to adhere abrasive particles, such as sand, onto the paper or linen. In addition, the present oxidized starch may be used as an adhesive for seeds or fertilizers.

Still another application is related to the stabilization of emulsions, in particular of emulsions used in the adhesive industry such as polyvinylacetate emulsions. An oxidized starch according to the invention may be used as a protective colloid for providing the desired stability.

In the textile industry, the present oxidized starch may be used to improve the weaving operation or weaving efficiency by warp yarn sizing. This results in an improved abrasion resistance of the warp yarns during the weaving process and less warp-end breakages. The present oxidized starch may further be applied as finishing agent to give a smooth and firm hand to fabrics. It may also be used for the coating of glass fibers (fabrics and non-wovens). In addition, it may be used as blanket adhesive in the textile printing industry.

In the food industry, Arabic gum may be replaced in e.g. confectioneries by an oxidized starch according to the invention. The excellent stability of the present oxidized starch, leads in these applications to a more clear food product.

It will be clear to the skilled person that the above list of applications is not intended to be extensive and that many more applications of the present oxidized starches are conceivable. In practice, the present product may be used in any application in which oxidized starches have conventionally been used.

The invention will now be elucidated by the following non-restrictive examples.

EXAMPLE 1

3.285 kg of amylopectine potato starch (2.83 kg dry matter) was suspended in 3.98 kg of water. The temperature of the suspension was increased to 35° C. 240 ml of a sodium hypochlorite solution containing 146.5 g/liter of active chlorine was added. During the oxidation the pH was maintained at 7.5 by the addition of a 4.4 wt. % sodium hydroxide solution. Once the reaction was complete, i.e. no chlorine was detectable with potassium iodide-starch paper, the pH was increased to 10.5 by the addition of a 4.4 wt. % sodium hydroxide solution. After two hours of alkaline post-treatment 7 ml sodium hypochlorite solution was added for decoloration, followed after two minutes by 2 g of sodium bisulphite. The reaction mixture was neutralized to pH 5.0 by the addition of 10 N $H_2SO_4$, whereupon the product was dewatered and washed before drying.

EXAMPLE 2

3.285 kg of amylopectine potato starch (2.83 kg dry matter) was suspended in 3.98 kg of water. The temperature of the suspension was increased to 35° C. 240 ml of a sodium hypochlorite solution containing 146.5 g/liter of active chlorine was added. During the oxidation the pH was maintained at 7.5 by the addition of a 4.4 wt. % sodium hydroxide solution. Once the reaction was complete, i.e. when no chlorine was detectable with potassium iodide-starch paper, the reaction mixture was neutralized to pH 5.0 by the addition of 10 N $H_2SO_4$, whereupon the product was dewatered and washed before drying.

EXAMPLE 3

3.285 kg of amylopectine potato starch (2.83 kg dry matter) was suspended in 3.98 kg of water. The temperature of the suspension was increased to 35° C. 240 ml of a sodium hypochlorite solution containing 146.5 g/liter of active chlorine was added. During the oxidation the pH was maintained at 7.5 by the addition of a 4.4 wt. % sodium hydroxide solution. Once the reaction was complete, i.e. when no chlorine was detectable with potassium iodide-starch paper, the pH was increased to 11.5 by the addition of a 4.4% sodium hydroxide solution. After one hours of alkaline post-treatment 7 ml a sodium hypochlorite solution was added for decoloration, followed after two minutes by 2 g of sodium bisulphite. The reaction mixture was neutralized to pH 5.0 by the addition of 10 N $H_2SO_4$, whereupon the product was dewatered and washed before drying.

EXAMPLE 4

Comparative to Example 2 of WO 97/04167

1.525 kg of amylopectine potato starch (1.30 kg dry matter) was suspended in 1.798 kg of water. The temperature of the suspension was increased to 35° C. The pH was increased to pH 9.5 by the addition of a 4.4% sodium hydroxide solution. 225 ml of a sodium hypochlorite solution containing 146.5 g/liter of active chlorine was added. During the oxidation the pH was maintained at 9.5 by the addition of a 4.4 wt. % sodium hydroxide solution. Once the reaction was complete, i.e. when no chlorine was detectable with potassium iodide-starch paper, the reaction mixture was neutralized to pH 5.0 by the addition of 6 N HCl, whereupon the product was dewatered and washed before drying.

EXAMPLE 5

1.525 kg of amylopectine potato starch (1.30 kg dry matter) was suspended in 1.798 kg of water. The temperature of the suspension was increased to 35° C. The pH was increased to pH 9.5 by the addition of a 4.4% sodium hydroxide solution. 225 ml of a sodium hypochlorite solution containing 146.5 g/liter of active chlorine was added. During the oxidation the pH was maintained at 9.5 by the addition of a 4.4 wt. % sodium hydroxide solution. Once the reaction was complete, i.e. no chlorine was detectable with potassium iodide-starch paper, the pH was increased to 10.5 by the addition of a 4.4 wt. % sodium hydroxide solution. After two hours of alkaline post-treatment 5 ml a sodium hypochlorite solution was added for decoloration, followed after two minutes by 2 g of sodium bisulphite. The reaction mixture was neutralized to pH 5.0 by the addition of 6 N HCl, whereupon the product was dewatered and washed before drying.

EXAMPLE 6

Comparative to Example 1 of WO 97/04167

1.537 kg of regular potato starch (1.30 kg dry matter) was suspended in 1.785 kg of water. The temperature of the suspension was increased to 35° C. The pH was increased to pH 9.5 by the addition of a 4.4 wt. % sodium hydroxide solution. 476 ml of a sodium hypochlorite solution containing 146.5 g/liter of active chlorine was added. During the oxidation the pH was maintained at 9.5 by the addition of a 4.4 wt. % sodium hydroxide solution. Once the reaction was complete, i.e. when no chlorine was detectable with potassium iodide-starch paper, the reaction mixture was neutralized to pH 5.0 by the addition of 6 N HCl, whereupon the product was dewatered and washed before drying.

EXAMPLE 7

1.537 kg of regular potato starch (1.30 kg dry matter) was suspended in 1.785 kg of water. The temperature of the suspension was increased to 35° C. The pH was increased to pH 9.5 by the addition of a 4.4% sodium hydroxide solution. 476 ml of a sodium hypochlorite solution containing 146.5 g/liter of active chlorine was added. During the oxidation the pH was maintained at 9.5 by the addition of a 4.4 wt. % sodium hydroxide solution. Once the reaction was complete, i.e. when no chlorine was detectable with potassium iodide-starch paper, the pH was increased to 10.5 by the addition of a 4.4 wt. % sodium hydroxide solution. After two hours of alkaline post-treatment 5 ml a sodium hypochlorite solution was added for decoloration, followed after two minutes by 2 g of sodium bisulphite. The reaction mixture was neutralized to pH 5.0 by the addition of 6 N HCl, whereupon the product was dewatered and washed before drying.

EXAMPLE 8

The oxidized starch derivatives were dissolved in 30% (dry matter) on a boiling waterbath with high speed stirring (600–1200 rpm). After 30 minutes the solutions were stored at 80° C. and the viscosity was measured after 0, 1, 3 and 20 hours. The results of the different oxidized starches is shown in table II.

TABLE II

|  | Oxidized starch for example no. | | | | | | |
| --- | --- | --- | --- | --- | --- | --- | --- |
|  | 1 | 2 | 3 | 4 | 5 | 6 | 7 |
| Starch | APS | APS | APS | APS | APS | PS | PS |
| amount of $Cl_2$/kg starch (g) | 10 | 10 | 10 | 20.4 | 20.4 | 43.3 | 43.3 |
| pH during oxidation | 7.5 | 7.5 | 7.5 | 9.5 | 9.5 | 9.5 | 9.5 |
| alkaline post-treatment | yes* | no | yes@ | no | yes* | no | yes* |
| Brookfield viscosity (30%, 80° C., 30 rpm) | | | | | | | |
| 0 hours | 95 | 510 | 98 | 106 | 91 | 53 | 51 |
| 1 hour | 102 | 370 | 100 | 108 | 94 | 57 | 51 |
| 3 hours | 102 | 250 | 102 | 103 | 94 | 56 | 48 |
| 20 hours | 94 | 68 | 92 | 75 | 75 | 37 | 35 |
| pH (20 hours) | 5.9 | 4.4 | 5.6 | 5.9 | 5.8 | 5.5 | 5.4 |
| visc. 20 hours/0 hours | 0.99 | 0.18 | 0.94 | 0.71 | 0.82 | 0.70 | 0.69 |

*pH 10.5 for 2 hours
@pH 11.5 for 1 hour
APS = amylopectin potato starch
PS = regular potato starch From the data presented in table II, it can be seen that the starches prepared according to example 1 and 3 exhibited an excellent viscosity stability at 80° C.

EXAMPLE 9

Brabender viscosity curves were measured in 30 wt. % (dry matter), with the following temperature program; start 30° C., heating to 90° C. (1.5° C./minute), 20 minutes at 90° C., cooling to 30° C. (1.5° C./minute). The peak viscosity and the viscosity after 20 minutes at 90° C. (in Brabender units, BU) of the different starches is depicted in table II. Also the peak-breakdown ratio, defined as the peak viscosity divided by the viscosity after 20 minutes at 90° C., is presented in table

TABLE III

| | Oxidized starch from example no. | | | | | | |
|---|---|---|---|---|---|---|---|
| | 1 | 2 | 3 | 4 | 5 | 6 | 7 |
| Starch | APS | APS | APS | APS | APS | PS | PS |
| amount of $Cl_2$/kg starch (g) | 10 | 10 | 10 | 20.4 | 20.4 | 43.3 | 43.3 |
| pH during oxidation | 7.5 | 7.5 | 7.5 | 9.5 | 9.5 | 9.5 | 9.5 |
| alkaline post-treatment | yes* | no | yes@ | no | yes* | no | yes* |
| Brabender viscosity (30 wt. %, 250 cmg, 75 rpm) | | | | | | | |
| $BU_{top}$ | 730 | ## | 700 | 2030 | 1430 | 1750 | 1180 |
| $BU_{90-20}$ | 180 | ## | 180 | 100 | 100 | 175 | 150 |
| $BU_{top}BU_{90-20}$ | 4.0 | ## | 3.9 | 20 | 14 | 10 | 7.9 |

*pH 10.5 for 2 hours
@pH 11.5 for 1 hour
to high peak viscosity to measure in Brabender at 30%
APS = amylopectin potato starch
PS = regular potato starch It can be seen, that the products prepared according to example 1 and 3 exhibited a peak-breakdown ratio of less then 5.

EXAMPLE 10

The oxidized starch derivatives were analyzed for their intrinsic viscosity (IV) and the acid number (ZGT). The intrinsic viscosity was determined using an Ubbelohde viscosity meter with 1 M NaOH as solvent. The acid number was determined titrimetrically by bringing the starch in the acid form using hydrochloric acid and by titrating to pH 8.6 using 0.1 M NaOH.

The results for the different oxidized starches are shown in table IV.

TABLE IV

| | Oxidized starch from example no. | | | | | | |
|---|---|---|---|---|---|---|---|
| | 1 | 2 | 3 | 4 | 5 | 6 | 7 |
| Starch | APS | APS | APS | APS | APS | PS | PS |
| amount of $Cl_2$/kg starch (g) | 10 | 10 | 10 | 20.4 | 20.4 | 43.3 | 43.3 |
| pH during oxidation | 7.5 | 7.5 | 7.5 | 9.5 | 9.5 | 9.5 | 9.5 |
| alkaline post-treatment | yes* | no | yes@ | no | yes* | no | yes* |
| Analytic data | | | | | | | |
| IV (g/dl) | 0.40 | 0.39 | 0.40 | 0.39 | 0.40 | 0.35 | 0.28 |
| ZGT (µg eq/g ds) | 113 | 115 | 113 | 179 | 175 | 324 | 312 |
| $(IV*ZGT)^{-1}$ | 0.022 | 0.022 | 0.022 | 0.014 | 0.014 | 0.009 | 0.011 |

*pH 10.5 for 2 hours
@pH 11.5 for 1 hour
APS = amylopectin potato starch
PS = regular potato starch

EXAMPLE 11

The oxidized amylopectin starch, prepared in accordance with Example 1, was tested in a wood containing topcoat in comparison with carboxymethylcellulose (CMC). The coating formula is depicted in Table V. The coating colors were analyzed for their dry substance (CEM lab wave 9000), pH, high shear viscosity (Hercules), Water retention (AAGWR) at 0.5 and 1.5 bar for 15 seconds and the viscosity established by Eklund Capillary Viscometer (ECV).

TABLE V

| Coating formula no. | I | II | |
|---|---|---|---|
| Premier No. 1 (ECC) | 50 | 50 | parts |
| Hydrocarb 90 (Omya) | 50 | 50 | parts |
| DOW 935 | 12 | 12 | parts |
| Nopcote 104 | 0.9 | 0.9 | parts |
| Oxidized starch | | 1.4 | parts |
| CMC (Finnfix FF 30) | 0.7 | | parts |

TABLE V-continued

| Coating formula no. | I | II | |
|---|---|---|---|
| Analyses: | | | |
| Dry substance | 65.7 | 66.1 | % |
| pH | 8.8 | 8.8 | |
| Brookfield viscosity 10 rpm | 7600 | 4000 | mPas |

TABLE V-continued

| Coating formula no. | I | II | |
|---|---|---|---|
| Brookfield viscosity 100 rpm | 1320 | 840 | mPas |
| High shear viscosity 100 rpm | 191 | 162 | mPas |
| High shear viscosity 1000 rpm | 72.6 | 84.9 | mPas |
| AAGWR 0.5 bar 15" | 35.5 | 25.88 | g/m$^2$ |
| AAGWR 1.5 bar 15" | 53.75 | 36.25 | g/m$^2$ |
| ECV 100000 | 120 | 89 | mPas |
| ECV 700000 | 37 | 47 | mPas |

The rheological results indicate that a 2 to 1 replacement of CMC with oxidized amylopectin starch is possible, without a dramatic change in dewatering behavior.

EXAMPLE 12

The oxidized amylopectin starch, prepared in accordance with Example 1, was tested in surface sizing in comparison with a commercial available oxidized and stabilized starch for ink-jet printing paper. The ink-jet papers were analyzed for their sheet weight (Tappi T 140), starch content (Bohringer method), brightness (Tappi T 452), porosity (ISO 5636-5), HP ink-jet printability test (HP Paper Acceptance Criteria 3.4), bursting strength (Tappi T 405), stiffness (Tappi T 535), tearing resistance (Tappi T 414), Internal bond (Tappi 506-wd-83/UM 584), Cobb test (NEN 3291), density ink-jet colors (Macbeth densito meter), Dennison wax test (Tappi T 459 SU-65) and the IGT pick resistance (Tappi T 514). The results are depicted in Table VI.

TABLE VI

| Surface sizing formula no. | Regular starch | Amylopectin | |
|---|---|---|---|
| Density ink-jet colors | | | |
| black | 0.83 | 0.93 | |
| yellow | 1.05 | 1.09 | |
| magenta | 1.02 | 1.09 | |
| blue | 1.31 | 1.32 | |
| Internal bond | 290 | 366 | J/m$^2$ |
| Stiffness | 0.43 | 0.43 | mN/m |
| Porosity | 20.5 | 25.5 | s/100 ml |
| Sheet weight | 79.3 | 79.4 | g/m$^2$ |
| Tearing resistance | 526 | 492 | mN |
| Starch content | 38 | 34 | mg/g |
| Bleed | acceptable | acceptable | |
| Dennison wax test | 16 | 16 | |
| Cobb 60 | 19.1 | 17.3 | g/m$^2$ |
| Burst | 171.3 | 156.2 | kPa |
| Whiteness | 87.32 | 86.68 | % |
| Whiteness (UV) | 99.96 | 98.37 | % |

Surface sizing with oxidized amylopectin starch resulted in a better ink-jet printability, higher internal strength, lower porosity and a lower Cobb 60 value. All these properties were obtained with a lower starch content of the paper.

What is claimed is:

1. A process for the oxidation of a starch, comprising
   i. treating a root or tuber starch comprising at least 95 wt. % of amylopectin, based on dry substance of the starch, with an alkali metal hypochlorite, at a pH between 6.5 and 8.5 to form an oxidized starch product, and
   ii. after oxidation is complete, subjecting the oxidized starch product to an alkaline treatment, wherein the alkaline treatment comprises keeping the oxidized starch product at a temperature of 20–50° C. and a pH higher than 10, for at least 15 minutes.

2. A process according to claim 1, wherein the alkaline treatment lasts at least 30 minutes, preferably at least 60 minutes.

3. A process according to claim 1, wherein the alkaline treatment lasts at least 60 minutes.

4. A process according to claim 1, wherein the alkaline treatment is performed at a pH higher than 10.5.

5. A process according to claim 1, wherein the alkali metal hypochlorite is sodium hypochlorite.

6. A process according to claim 1, wherein the oxidized starch product is treated with the alkali metal hypochlorite at a pH between 6.5 and 8.5.

7. A process for the oxidation of a starch, comprising
   i. treating a root or tuber starch comprising at least 95 wt. % of amylopectin, based on dry substance of the starch, with an alkali metal hypochlorite, at a pH between 6.5 and 8.5 to form an oxidized starch product, wherein the alkali metal hypochlorite is in an amount between 0.001 and 0.4 moles per mole of starch; and
   ii. after oxidation is complete, subjecting the oxidized starch product to an alkaline treatment, wherein the alkaline treatment comprises keeping the oxidized starch product at a temperature of 20–50° C. and a pH higher than 10, for at least 15 minutes.

* * * * *

UNITED STATES PATENT AND TRADEMARK OFFICE
CERTIFICATE OF CORRECTION

PATENT NO.   : 6,777,548 B1
DATED        : August 17, 2004
INVENTOR(S)  : Kesselmans et al.

It is certified that error appears in the above-identified patent and that said Letters Patent is hereby corrected as shown below:

Column 10,
Line 67, now reads "table" should read -- table III. --.

Signed and Sealed this

Eleventh Day of January, 2005

JON W. DUDAS
*Director of the United States Patent and Trademark Office*